United States Patent
Kitano

(10) Patent No.: US 11,294,038 B2
(45) Date of Patent: Apr. 5, 2022

(54) LIGHT CONTROL DEVICE, LIGHT CONTROL METHOD AND PROGRAM

(71) Applicant: PIONEER CORPORATION, Tokyo (JP)

(72) Inventor: Kazutoshi Kitano, Kanagawa (JP)

(73) Assignee: PIONEER CORPORATION, Tokyo (JP)

(*) Notice: Subject to any disclaimer, the term of this patent is extended or adjusted under 35 U.S.C. 154(b) by 405 days.

(21) Appl. No.: 15/759,821

(22) PCT Filed: Oct. 6, 2015

(86) PCT No.: PCT/JP2015/078342
§ 371 (c)(1),
(2) Date: Mar. 13, 2018

(87) PCT Pub. No.: WO2017/060976
PCT Pub. Date: Apr. 13, 2017

(65) Prior Publication Data
US 2018/0267145 A1    Sep. 20, 2018

(51) Int. Cl.
*G01S 7/484* (2006.01)
*G02B 26/10* (2006.01)
(Continued)

(52) U.S. Cl.
CPC .......... *G01S 7/484* (2013.01); *G01S 7/4817* (2013.01); *G01S 7/4861* (2013.01); *G01S 17/42* (2013.01);
(Continued)

(58) Field of Classification Search
None
See application file for complete search history.

(56) References Cited

U.S. PATENT DOCUMENTS

| 8,473,144 B1 | 6/2013 | Dolgov et al. |
| 2003/0046025 A1* | 3/2003 | Jamieson ................ G01S 7/481 702/159 |

(Continued)

FOREIGN PATENT DOCUMENTS

| JP | 2009-98111 A | 5/2009 |
| JP | 2010175856 A | 8/2010 |

(Continued)

OTHER PUBLICATIONS

Extended European Search Report for related EP App No. 15905796.7 dated Mar. 26, 2019, 8 pgs.
(Continued)

*Primary Examiner* — Yuqing Xiao
*Assistant Examiner* — Amir J Askarian
(74) *Attorney, Agent, or Firm* — Procopio, Cory, Hargreaves & Savitch LLP

(57) ABSTRACT

The light control device is installed in a movable body, and comprises a light transmission/reception unit including an emission unit and a light receiving unit. The emission unit emits a light, and the light receiving unit receives the light reflected by an object around the movable body. The control unit controls the emission unit to continuously shift the light emitted by the emission unit in a first direction and a second direction crossing the first direction such that a transition locus of the light emitted by the emission unit becomes helical.

8 Claims, 7 Drawing Sheets

(51) Int. Cl.
  *G01S 17/42* (2006.01)
  *G01S 17/89* (2020.01)
  *G01S 17/93* (2020.01)
  *G01S 7/481* (2006.01)
  *G01S 7/4861* (2020.01)
  *G01S 17/931* (2020.01)

(52) U.S. Cl.
  CPC .............. *G01S 17/89* (2013.01); *G01S 17/93* (2013.01); *G02B 26/10* (2013.01); *G01S 17/931* (2020.01)

(56) References Cited

U.S. PATENT DOCUMENTS

| | | |
|---|---|---|
| 2007/0228262 A1 | 10/2007 | Cantin et al. |
| 2009/0002678 A1 | 1/2009 | Tanaka et al. |
| 2009/0021959 A1* | 1/2009 | Yoshikawa .......... G02B 6/0031 362/609 |
| 2010/0121146 A1* | 5/2010 | Sugimoto .......... G02B 23/2423 600/117 |
| 2010/0188648 A1 | 7/2010 | Maeno et al. |
| 2010/0208232 A1* | 8/2010 | Hara .................... G01S 7/4811 356/4.09 |
| 2011/0205521 A1 | 8/2011 | Mimeault et al. |
| 2012/0241620 A1* | 9/2012 | On ...................... A61B 5/0071 250/338.1 |
| 2014/0078519 A1* | 3/2014 | Steffey .................. G01S 7/4817 356/625 |
| 2014/0121880 A1 | 5/2014 | Dolgov et al. |
| 2014/0226145 A1* | 8/2014 | Steffey .................. G01S 7/4813 356/4.01 |
| 2014/0297094 A1 | 10/2014 | Dolgov et al. |
| 2015/0018531 A1 | 1/2015 | Saunders et al. |
| 2015/0185313 A1* | 7/2015 | Zhu ........................ G01S 7/4817 356/5.01 |
| 2015/0192677 A1 | 7/2015 | Yu et al. |
| 2015/0226840 A1* | 8/2015 | Becker ................. G01S 17/86 356/5.01 |
| 2015/0323350 A1* | 11/2015 | Kramer ................ G01D 5/3473 250/231.14 |
| 2016/0169659 A1 | 6/2016 | Steffey et al. |
| 2016/0198933 A1* | 7/2016 | Koshika ............... G02B 26/103 600/109 |
| 2017/0168145 A1 | 6/2017 | Sakabe |
| 2017/0336508 A1* | 11/2017 | Zweigle ................. G01S 7/003 |
| 2018/0089846 A1* | 3/2018 | Wohlfeld ................. G06T 7/70 |
| 2018/0101707 A1* | 4/2018 | Maryfield .......... G06K 7/10603 |

FOREIGN PATENT DOCUMENTS

| | | |
|---|---|---|
| JP | 2014020963 A | 2/2014 |
| JP | 2014-89691 A | 5/2014 |
| JP | 2014-170001 A | 9/2014 |
| JP | 2015-143620 A | 8/2015 |
| WO | 2014010107 A1 | 1/2014 |
| WO | WO-2014010107 A1 * | 1/2014 .......... G01S 17/89 |
| WO | 2015/115643 A1 | 8/2015 |

OTHER PUBLICATIONS

International Search Report for related PCT application PCT/JP2015/078342 dated Dec. 22, 2015; 4 pages.

European Patent Office, Extended European Search Report, Application No. 21201444.3, dated Jan. 18, 2022, in 6 pages.

* cited by examiner

FIG. 5A
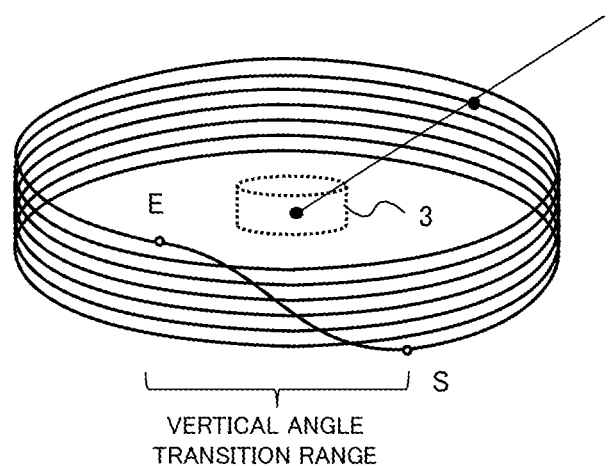
VERTICAL ANGLE
TRANSITION RANGE
FIG. 5B
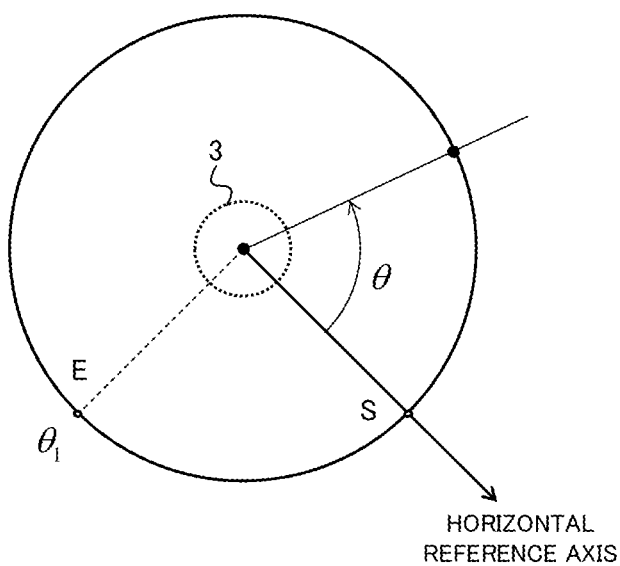
HORIZONTAL
REFERENCE AXIS
FIG. 5C  7 LAYERS
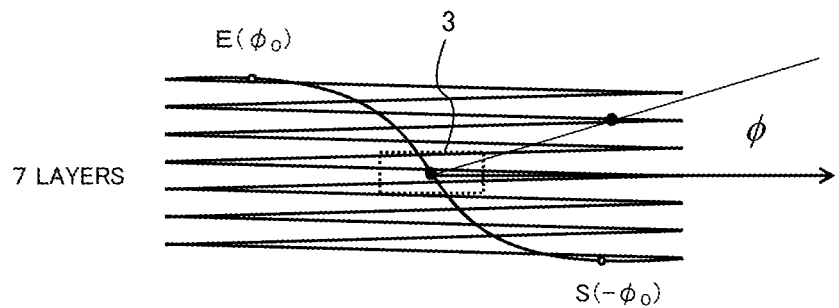

EFFECTIVE HORIZONTAL FIELD OF VIEW : $\theta_1 = 270°$
NUMBER OF SEGMENT PER LAYER: 900seg
HORIZONTAL ANGLE RESOLUTION: $\Delta \theta = 360/900 = 0.4°/\text{seg}$ VERTICAL FIELD OF VIEW : $(n-1) \times \Delta \phi = 30°$
NUMBER OF HELICAL LAYERS (TURNS): n=7
VERTICAL ANGLE RESOLUTION: $\Delta \phi = 35/7 = 5°/層$

VERTICAL ANGLE
TRANSITION RANGE

LIGHT CONTROL DEVICE, LIGHT CONTROL METHOD AND PROGRAM

CROSS-REFERENCE TO RELATED APPLICATIONS

This application is a U.S. National Stage entry of PCT Application No: PCT/JP2015/078342 filed Oct. 6, 2015, the contents of which are incorporated herein by reference.

TECHNICAL FIELD

The present invention relates to a light control device which controls a transition of an emitted light.

BACKGROUND TECHNIQUE

There is known a LIDAR which scans a horizontal direction while intermittently emitting a laser light, and detects point groups on a surface of an object by receiving a reflected light. Patent Reference 1 discloses a technique of scanning surroundings one-dimensionally or two-dimensionally by a LIDAR installed in a vehicle to detect information on a situation surrounding the vehicle.

PRIOR ART REFERENCE

Patent Reference

Patent Reference 1: Japanese Patent Application laid-Open under No. 2014-89691

SUMMARY OF THE INVENTION

Problem to be Solved by the Invention

In order to obtain information on the situation of surroundings three-dimensionally, it is necessary to use a multilayer-type LIDAR. However, the multilayer-type LIDAR takes very high cost because it needs a light transmitter/receiver for each of the layers.

The above is an example of the problem to be solved by the present invention. It is an object of the present invention to provide a light control device capable of obtaining three-dimensional information by using a single transmitter/receiver.

Means for Solving the Problem

An invention described in claims is a light control device comprising: a light transmission/reception unit installed in a movable body and including an emission unit configured to emit a light and a light receiving unit configured to receive the light reflected by an object around the movable body; and a control unit configured to control the emission unit to continuously shift the light emitted by the emission unit in a first direction and a second direction crossing the first direction such that a transition locus of the light emitted by the emission unit becomes helical.

Another invention described in claims is a light control method executed by a light control device comprising a light transmission/reception unit installed in a movable body and including an emission unit configured to emit a light and a light receiving unit configured to receive the light reflected by an object around the movable body, the method comprising a control process to control the emission unit to continuously shift the light emitted by the emission unit in a first direction and a second direction crossing the first direction such that a transition locus of the light emitted by the emission unit becomes helical.

Another invention described in claims is a program executed by a light control device comprising: a light transmission/reception unit installed in a movable body and including an emission unit configured to emit a light and a light receiving unit configured to receive the light reflected by an object around the movable body; and a computer, the program causing the computer to function as a control unit configured to control the emission unit to continuously shift the light emitted by the emission unit in a first direction and a second direction crossing the first direction such that a transition locus of the light emitted by the emission unit becomes helical.

Another invention described in claims is a light control device comprising: a light transmission/reception unit installed in a movable body and including an emission unit configured to emit a light and a light receiving unit configured to receive the light reflected by an object around the movable body; and a control unit configured to control the emission unit to continuously shift the light in a first direction and a second direction crossing the first direction such that the light emitted by the emission unit creates a helical locus on a predetermined surface in a space.

Another invention described in claims is a light control device comprising: a light transmission/reception unit installed in a movable body and including an emission unit configured to emit a light and a light receiving unit configured to receive the light; and a control unit configured to control the emission unit to perform a first control of continuously shifting the light in a first direction and a second control of continuously shifting the light in a second direction crossing the first direction, wherein, when an emission angle of the light emitted from the emission unit in the first direction becomes a predetermined angle, the control unit controls the emission unit to shift the emission angle of the light from the emission unit by a predetermined angle in the second direction while continuously shifting the light in the first direction.

BRIEF DESCRIPTION OF THE DRAWINGS

FIGS. 5A to 5C illustrate loci of a helical scanning according to a first embodiment.

DETAILED DESCRIPTION OF THE PREFERRED EMBODIMENTS

Figure 1:
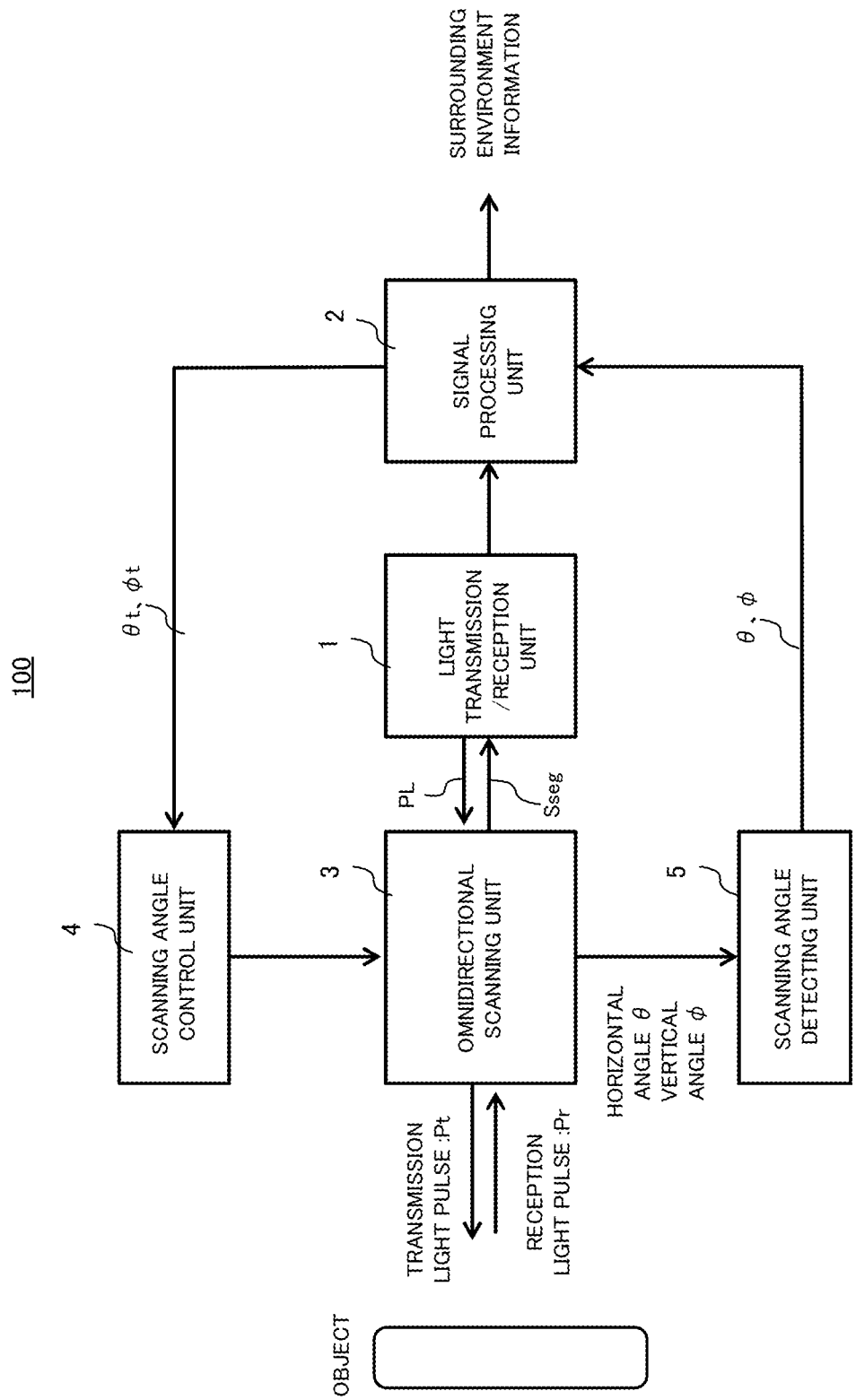
FIG. 1 is a block diagram illustrating a configuration of a Lidar unit according to embodiments.

According to one aspect of the present invention, there is provided a light control device comprising: a light transmission/reception unit installed in a movable body and including an emission unit configured to emit a light and a light receiving unit configured to receive the light reflected by an object around the movable body; and a control unit configured to control the emission unit to continuously shift the light emitted by the emission unit in a first direction and a second direction crossing the first direction such that a transition locus of the light emitted by the emission unit becomes helical.

The above light control device is installed in a movable body, and comprises a light transmission/reception unit including an emission unit and a light receiving unit. The emission unit emits a light, and the light receiving unit receives the light reflected by an object around the movable body. The control unit controls the emission unit to continuously shift the light emitted by the emission unit in a first direction and a second direction crossing the first direction such that a transition locus of the light emitted by the emission unit becomes helical. Thus, by continuously shifting the light emitted by the emission unit in the first direction and the second direction, it is possible to detect the object around the movable body three-dimensionally.

One mode of the above light control device further comprises: a first obtaining unit configured to obtain a first angle information indicating an emission angle of the light emitted by the emission unit in the first direction; and a second obtaining unit configured to obtain a second angle information indicating an emission angle of the light emitted by the emission unit in the second direction, wherein the control unit controls the emission unit based on the first angle information and the second angle information. In this mode, the control unit controls the transition locus of the emitted light to be helical based on the first angle information and the second angle information.

In another mode of the above light control device, the control unit controls the emission unit such that each angle of the first angle information and the second angle information become a reference angle when the angle of the second angle information becomes a predetermined angle. Thus, the same control can be repeated from the reference angle.

Still another mode of the above light control device further comprises a detecting unit configured to detect at least one of a distance to the object and an angle of the object based on a light receiving result of the light receiving unit. Thus, the surrounding environment information of the movable body can be obtained.

In a preferred example, the first direction is a horizontal direction, the control unit controls the emission unit such that the light is emitted in an omnidirection of the first direction, and the light receiving unit receives the light reflected by the object existing in the omnidirection of the first direction.

According to another aspect of the present invention, there is provided a light control method executed by a light control device comprising a light transmission/reception unit installed in a movable body and including an emission unit configured to emit a light and a light receiving unit configured to receive the light reflected by an object around the movable body, the method comprising a control process to control the emission unit to continuously shift the light emitted by the emission unit in a first direction and a second direction crossing the first direction such that a transition locus of the light emitted by the emission unit becomes helical. According to this method, by continuously shifting the light emitted by the emission unit in the first direction and the second direction, it is possible to detect the object around the movable body three-dimensionally.

In still another aspect of the present invention, there is provided a program executed by a light control device comprising: a light transmission/reception unit installed in a movable body and including an emission unit configured to emit a light and a light receiving unit configured to receive the light reflected by an object around the movable body; and a computer, the program causing the computer to function as a control unit configured to control the emission unit to continuously shift the light emitted by the emission unit in a first direction and a second direction crossing the first direction such that a transition locus of the light emitted by the emission unit becomes helical. By executing this program to continuously shift the light emitted by the emission unit in the first direction and the second direction, it is possible to detect the object around the movable body three-dimensionally.

According to still another aspect of the present invention, there is provided a light control device comprising: a light transmission/reception unit installed in a movable body and including an emission unit configured to emit a light and a light receiving unit configured to receive the light reflected by an object around the movable body; and a control unit configured to control the emission unit to continuously shift the light in a first direction and a second direction crossing the first direction such that the light emitted by the emission unit creates a helical locus on a predetermined surface in a space.

The above light control device includes a light transmission/reception unit installed in a movable body and including an emission unit and a light receiving unit. The emission unit emits a light, and the light receiving unit receives the light reflected by the object around the movable body. The control unit controls the emission unit to continuously shift the light in a first direction and a second direction crossing the first direction such that the light emitted by the emission unit creates a helical locus on a predetermined surface in a space. Thus, by continuously shifting the light emitted by the emission unit in the first direction and the second direction, it is possible to detect the object around the movable body three-dimensionally.

According to still another aspect of the present invention, there is provided a light control device comprising: a light transmission/reception unit installed in a movable body and including an emission unit configured to emit a light and a light receiving unit configured to receive the light; and a control unit configured to control the emission unit to perform a first control of continuously shifting the light in a first direction and a second control of continuously shifting the light in a second direction crossing the first direction, wherein, when an emission angle of the light emitted from the emission unit in the first direction becomes a predetermined angle, the control unit controls the emission unit to shift the emission angle of the light from the emission unit by a predetermined angle in the second direction while continuously shifting the light in the first direction.

The above light control device includes a light transmission/reception unit installed in a movable body and including an emission unit and a light receiving unit. The emission unit emits a light, and the light receiving unit receives the light reflected by the object around the movable body. The control unit controls the emission unit to perform a first control of continuously shifting the light in a first direction and a second control of continuously shifting the light in a second direction crossing the first direction. Then, when then emission angle of the light emitted from the emission unit in the first direction becomes a predetermined angle, the control unit controls the emission unit to shift the emission angle of the light from the emission unit by a predetermined angle in the second direction while continuously shifting the light in the first direction. Thus, by continuously shifting the light emitted by the emission unit in the first direction and the second direction, it is possible to detect the object around the movable body three-dimensionally.

Embodiments

Preferred embodiments of the present invention will be described below with reference to the attached drawings.

[Configuration]

FIG. 1 is a block diagram illustrating a configuration of a Lidar unit 100 according to an embodiment. The Lidar unit 100 of the embodiment is a Lidar (Light Detection and Ranging, or Laser Illuminated Detection And Ranging) of TOF (Time Of Flight) system, and measures a distance to a body (object) in an omnidirectional and horizontal direction. As illustrated, the Lidar unit 100 includes a light transmission/reception unit 1, a signal processing unit 2, an omnidirectional scanning unit 3, a scanning angle control unit 4 and a scanning angle detecting unit 5.

The light transmission/reception unit 1, including a laser diode or the like, generates laser pulses PL and supplies them to the omnidirectional scanning unit 3. The omnidirectional scanning unit 3 emits the laser pulses (hereinafter referred to as "transmission light pulses Pt") omnidirectionally, i.e., to 360° in the horizontal direction, while vertically shifting the emission direction. At that time, the omnidirectional scanning unit 3 emits the transmission light pulse Pt at each of segments (900 segments in this embodiment) obtained by dividing the omnidirection, i.e., 360° in the horizontal direction by equal angles. Further, the omnidirectional scanning unit 3 receives reflected lights (hereinafter referred to as "reception light pulses Pr") of the transmission light pulses Pt within a predetermined time period after emitting the transmission light pulses Pt, and supplies them to the light transmission/reception unit 1. The light transmission/reception unit 1 generates a signal (hereinafter referred to as "a segment signal Sseg") associated with a light reception intensity at each segment based on the reception light pulses Pr, and outputs it to the signal processing unit 2.

The signal processing unit 2 outputs surrounding environment information, including at least one of a distance to the object and an angle of the object, based on the segment signals Sseg at each segment received from the light transmission/reception unit 1. The surrounding environment information indicates surrounding environment of the vehicle on which the Lidar unit 100 is installed, and specifically indicates the distance and the angle of the object existing in the omnidirection around the vehicle.

The scanning angle detecting unit 5 detects a horizontal angle θ and a vertical angle φ indicating the emission direction of the transmission light pulses Pt emitted by the omnidirectional scanning unit 3, and supplies them to the signal processing unit 2. The signal processing unit 2 generates a target horizontal angle θt and a target vertical angle φt, serving as the control targets, based on the horizontal angle θ and the vertical angle φ detected by the scanning angle detecting unit 5, and supplies them to the scanning angle control unit 4. The scanning angle control unit 4 controls the scanning angle of the transmission light pulses Pt by the omnidirectional scanning unit 3, based on the target horizontal angle θt and the target vertical angle φt supplied from the signal processing unit 2. Thus, the omnidirectional scanning unit 3 is controlled to emit the transmission light pulses Pt to the target horizontal angle θt and the target vertical angle φt.

Figure 2:
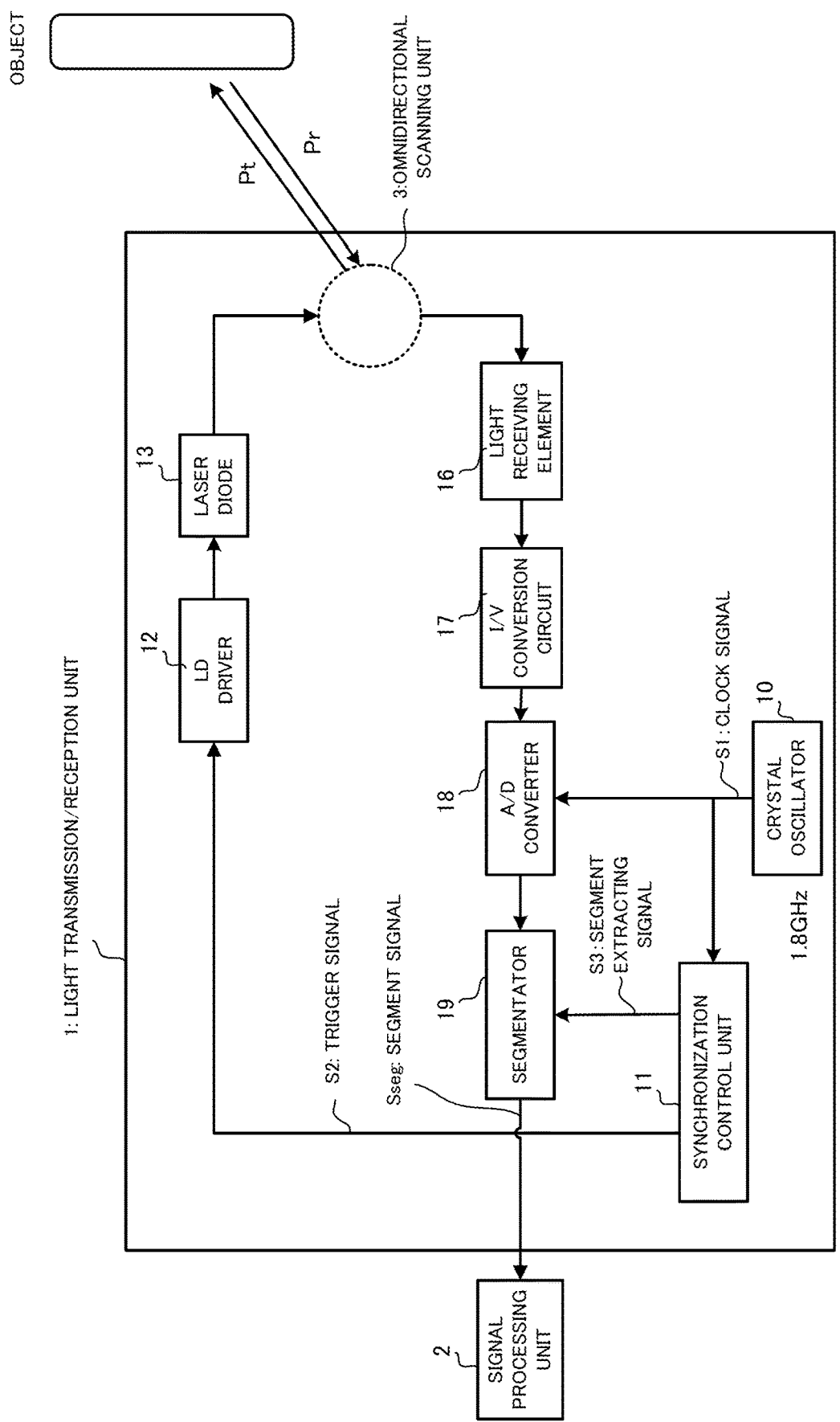
FIG. 2 is a block diagram illustrating a configuration of a light transmission/reception unit.

Next, the light transmission/reception unit 1 will be described in detail. FIG. 2 illustrates the configuration of the light transmission/reception unit 1. The light transmission/reception unit 1 mainly includes a crystal oscillator 10, a synchronization control unit 11, an LD driver 12, a laser diode (LD) 13, a light receiving element 16, a current-voltage converting circuit (a trans-impedance amplifier) 17, an A/D converter 18 and a segmentator 19. The light transmission/reception unit 1 is an example of "the light transmission/reception unit" according to the present invention.

The crystal oscillator 10 outputs a pulse-type clock signal S1 to the synchronization control unit 11 and the A/D converter 18. In this embodiment, as an example, the clock frequency is 1.8 GHz. In the following description, the clocks of the clock signal S1 is referred to as "sample clocks".

Figure 3:
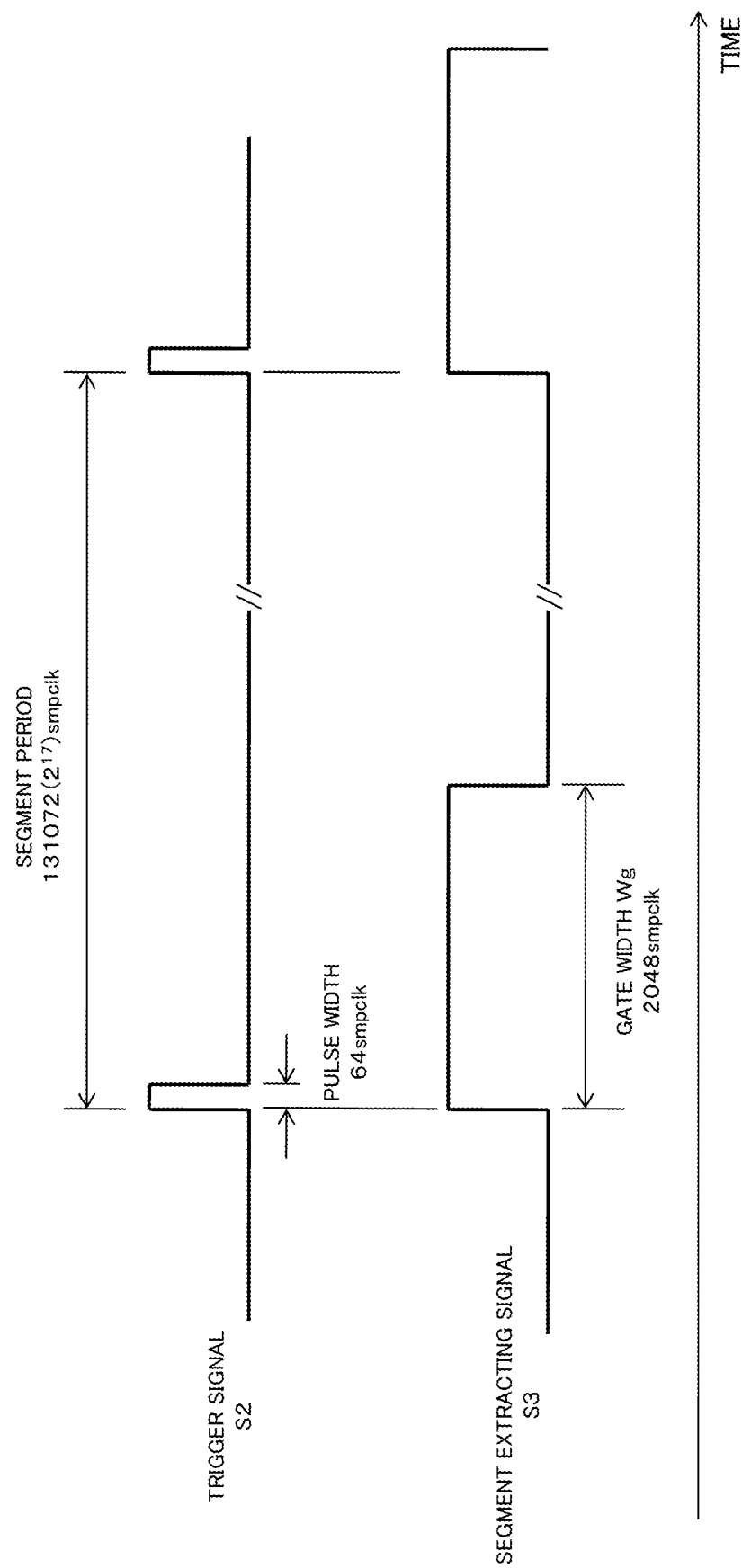
FIG. 3 illustrates waveforms of a trigger signal and a segment extracting signal.

The synchronization control unit 11 outputs a pulse-type signal (hereinafter referred to as "a trigger signal S2") to the LD driver 12. In this embodiment, the trigger signal S2 is periodically asserted by the period of $131072(=2^{17})$ sample clocks. In the following description, the time period from the time when the trigger signal S2 is asserted to the time when the trigger signal S2 is asserted next time is referred to as "a segment period". The synchronization control unit 11 outputs, to the segmentator 19, a signal (hereinafter referred to as "a segment extracting signal S3") determining the timing at which the segmentator 19 described later extracts the output of the A/D converter 18. The trigger signal S2 and the segment extracting signal S3 are logic signals, and are synchronized with each other as shown in FIG. 3 described later. In this embodiment, the synchronization control unit 11 asserts the segment extracting signal S3 for the time width (referred to as "a gate width Wg") of 2048 sample clocks.

The LD driver 12 applies the pulse current to the laser diode 13 in synchronization with the trigger signal S2 inputted from the synchronization control unit 11. The laser diode 13 is an infrared (905 nm) pulse laser, for example, and emits the light pulses based on the pulse current supplied from the LD driver 12. In this embodiment, the laser diode 13 emits the light pulses of approximately 5 nsec.

The light pulses emitted from the laser diode 13 is transmitted to the omnidirectional scanning unit 3 via an optical system. The omnidirectional scanning unit 3 emits the transmission light pulses Pt, and receives the light pulses reflected by the object as the reception light pulses Pr to supply them to the light receiving element 16. The laser diode 13 is an example of "an emission unit" according to the present invention.

The light receiving element 16 is an avalanche diode, for example, and generates a weak current corresponding to the light quantity of the reception light pulses Pr guided by the omnidirectional scanning unit 3. The light receiving element 16 supplies the generated weak current to the current-voltage converting circuit 17. The current-voltage converting circuit 17 amplifies the weak current supplied from the light receiving element 16 and converts it to a voltage signal, and inputs the converted voltage signal to the A/D converter 18.

The A/D converter 18 converts the voltage signal supplied from the current-voltage converting circuit 17 to a digital signal based on the clock signal S1 supplied from the crystal oscillator 10, and supplies the converted digital signal to the segmentator 19. In the following description, the digital signal that the A/D converter 18 generates every one clock will be referred to as "a sample". The light receiving element 16, the current-voltage converting circuit 17 and the A/D converter 18 are examples of "the light receiving unit" according to the present invention.

The segmentator 19 generates the digital signal outputted by the A/D converter 18 during 2048 sample clocks in the period of the gate width Wg, during which the segment extracting signal S3 is being asserted, as the segment signal Sseg. The segmentator 19 supplies the generated segment signal Sseg to the signal processing unit 2.

FIG. 3 illustrates waveforms of the trigger signal S2 and the segment extracting signal S3 in time series. As illustrated in FIG. 3, in this embodiment, the segment period, which is a one-cycle period of asserting the trigger signal S2, is set to the length of 131072 sample clocks (shown as "smpclk" in FIG. 3). The pulse width of the trigger signal S2 is set to the length of 64 sample clocks, and the gate width Wg is set to the length of 2048 sample clocks.

In this case, since the segment extracting signal S3 is asserted for the time period of the gate width Wg after the trigger signal S2 is asserted, the segmentator 19 extracts 2048 samples outputted by the A/D converter 18 while the trigger signal S2 is asserted. As the gate width Wg becomes longer, the maximum measurement distance (limit measurement distance) from the Lidar unit 100 becomes longer.

Figure 4A:
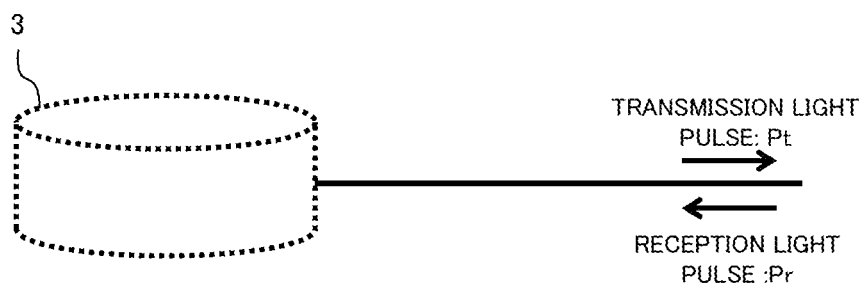
FIGS. 4A to 4C schematically illustrate operation of an omnidirectional scanning unit.
Figure 4B:
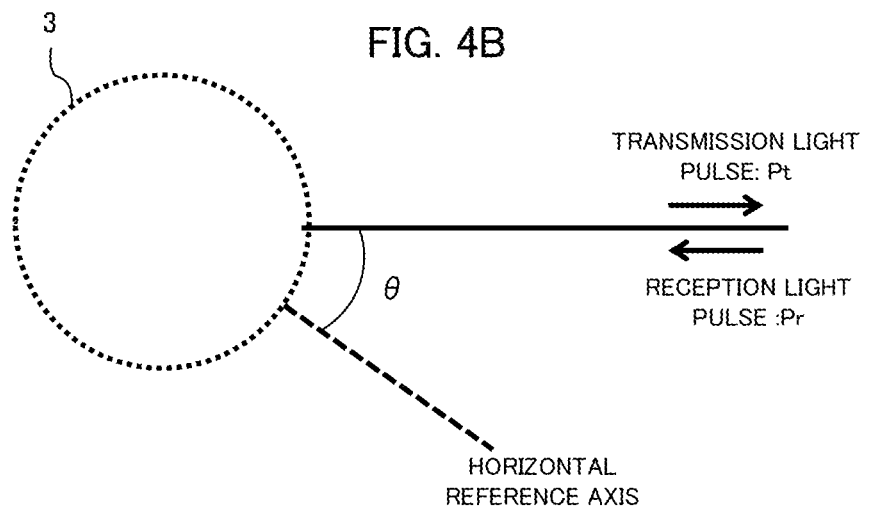
Figure 4C:
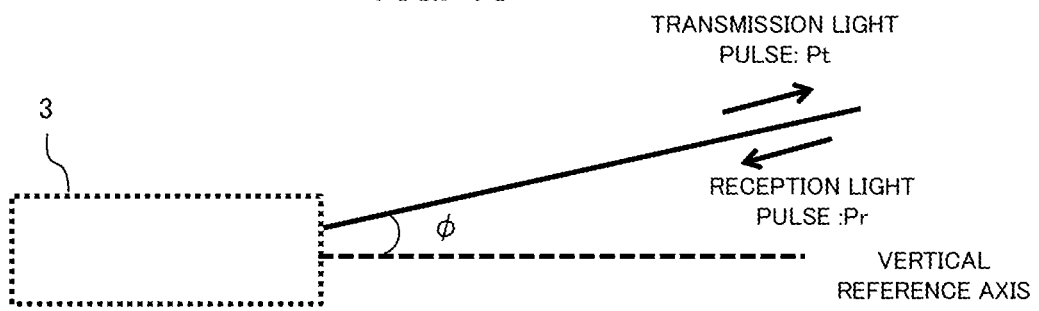

Next, the omnidirectional scanning unit 3 will be described in detail. The omnidirectional scanning unit 3 is configured by a rotatable mirror and an optical system for scanning the transmission light pulses Pt in 360°, for example. The direction (hereinafter referred to as "an emission direction") in which the omnidirectional scanning unit 3 transmits and receives the light pulses to and from the surrounding environment is determined by the horizontal angle θ and the vertical angle φ. FIGS. 4A to 4C illustrate examples of scanning conditions by the omnidirectional scanning unit 3. FIG. 4A is a perspective view showing the condition where the omnidirectional scanning unit 3 is horizontally scanning. FIG. 4B is a plan view of the scanning condition of the omnidirectional scanning unit 3 observed from above. With respect to the predetermined horizontal reference axis, the light pulses are scanned with the horizontal angle θ. The horizontal angle θ varies 360° [deg] with respect to the horizontal reference axis. Namely, the light pulses can scan in all directions (0°-360°). FIG. 4C illustrates the condition where the omnidirectional scanning unit 3 is scanning upper area than the horizontal scanning condition shown in FIG. 4A. Specifically, the omnidirectional scanning unit 3 is scanning the light pulses by the vertical angle φ with respect to the vertical reference axis. In this way, the omnidirectional scanning unit 3 can perform the three-dimensional scanning by continuously varying the angles in the horizontal and vertical directions. The omnidirectional scanning unit 3 is an example of "a control unit" according to the present invention.

[Scanning Control]

1st Embodiment

Next, an embodiment of the scanning control by the omnidirectional scanning unit 3 will be described. The omnidirectional scanning unit 3 performs multi-layer scanning in the vertical direction. Specifically, in the first embodiment described below, the omnidirectional scanning unit 3 performs seven-layer (number of layers: n=7) helical scanning in the vertical direction.

FIG. 5A to 5C illustrates loci of the helical scanning according to the first embodiment. FIG. 5A is a perspective view of the locus by the helical scanning, FIG. 5B is a plan view of the locus by the helical scanning, and FIG. 5C is a side view of the locus by the helical scanning. FIGS. 5A to 5C illustrates the loci that a certain point in the emission direction of the transmission light pulses Pt creates by the scanning of the omnidirectional scanning unit 3. In other words, FIGS. 5A to 5C illustrate the loci that the transmission light pulses Pt emitted by the omnidirectional scanning unit 3 draw on a certain plane in a space.

As illustrated, one (one-frame) helical scanning by the omnidirectional scanning unit 3 moves from the start point S to the end point E through seven-layer (seven-times wound) helical turn, and then returns to the start point S. The omnidirectional scanning unit 3 repeats this helical scanning. Specifically, during the one-frame helical scanning, the horizontal angle θ repeats the transition from 0° to 360° seven times. Meanwhile, the vertical angle φ varies from the vertical angle $-\varphi_0$ at the start point S to the vertical angle $\varphi_0$ at the end point E with a constant variation rate. The time period in which the emission direction of the transmission light pulses Pt returns from the end point E to the start point S will be referred to as "a vertical angle transition range". The vertical angle transition range is the range for returning the emission direction of the transmission light pulses Pt to a predetermined direction so as to repeat the helical scanning.

Figure 6A:
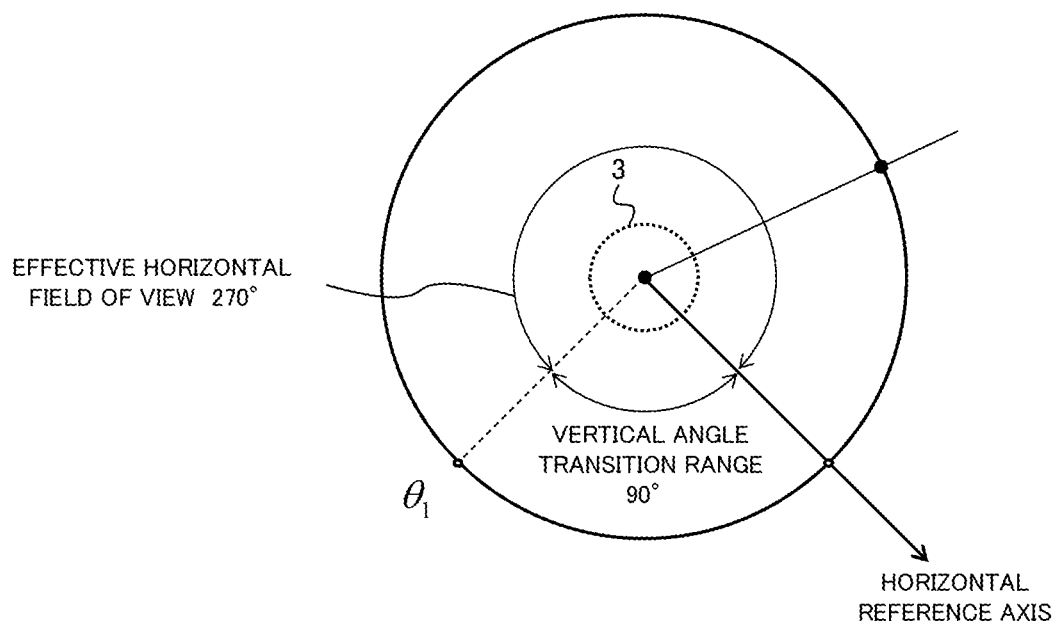
FIGS. 6A and 6B illustrate a scanning field of view by the helical scanning according to the first embodiment.

Next, a scanning field of view will be described. FIG. 6A illustrates a horizontal field of view of the helical scanning. In this embodiment, out of the omnidirection 360°, the vertical angle transition range is set to 90° and the remaining 270° is referred to as "an effective horizontal field of view $\theta_1$". Namely, $\theta_1$=270°. The effective horizontal field of view is the range obtained by eliminating the vertical angle transition range from the omnidirection 360°, where effective segment data can be obtained from the reception light pulses Pr. Now, assuming that 360° scanning by the omnidirectional scanning unit 3 corresponds to 900 segments, Number of segments per one turn=900/number of layers.

Also, a horizontal angle resolution Δθ is:

Δθ=360/900=0.4°/seg.

Figure 6B:
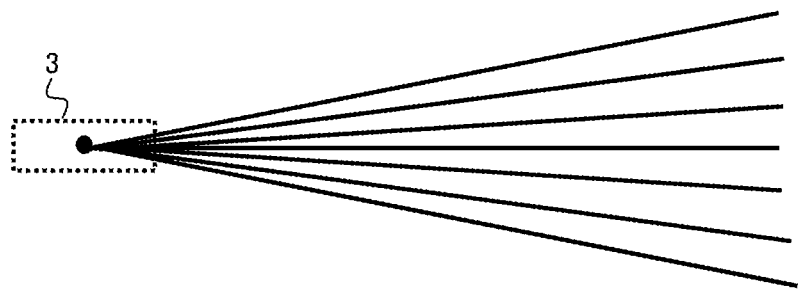

FIG. 6B illustrates the vertical field of view of the helical scanning. Assuming that the number of layers (number of turns) of the helical scanning is n(=7) and the vertical angle resolution of one layer is Δφ=5°, Vertical field of view=(n−1)×Δφ=30°, and the vertical angle φ varies in the range: −15°≤φ≤15°.

In the helical scanning, if the vertical angle φ is varied from the negative side to the positive side, the vertical angle φ is:

φ=−φ=−15°

Also, if it is desired to obtain the seven-layer segment data with the frame rate 15.26 Hz, the omnidirectional scanning unit 3 scans the transmission light pulses Pt with the angular velocity ω:

ω=2π×15.26×7=3846 deg/s

Assuming that an elapsed time after starting the helical scanning is "t", the horizontal angle can be obtained as follows:

$$\theta = \mod(\omega t, 360n) \qquad (1)$$

※ Accumlated horizontal angle along helical rotation

-continued $$\theta' = \mathrm{mod}(\omega t, 360) \qquad (2)$$

※ Horizontal angle in plane viewed from above

It is noted that the horizontal angle θ in the equation (1) is the accumulated horizontal angle along the helical rotation, and the horizontal angle θ' in the equation (2) is the horizontal angle when the locus of the helical scanning is horizontally viewed as shown in FIG. 5B.

Assuming that the number of layers of the helical scanning is "n", the vertical angle at the start point is $\varphi_0 = -15°$, the coefficient K=0.1389, and the effective horizontal field of view $\theta_1 = 270°$, the vertical angle φ is obtained as follows. Here, the equation (3) represents the vertical angle in the effective horizontal field of view, and the equation (4) represents the vertical angle in the vertical angle transition range.

$$\begin{cases} \phi = K\theta - \phi_0 & 0 < \theta < 360(n-1) + \theta_1 \quad (3) \\ \phi = f(\theta' - \theta_1) & 360(n-1) + \theta_1 < \theta < 360n \quad (4) \end{cases}$$

As described above, in the first embodiment, the omnidirectional scanning unit 3 can obtain three-dimensional segment data by performing the multi-layer helical scanning of the transmission light pulses Pt.

2nd Embodiment

In the helical scanning in the first embodiment, the vertical angle φ of the transmission light pulses Pt in the emission direction is helically varied with a constant variation rate. However, in the helical scanning in the first embodiment, since the data obtained in one layer is obtained with gradually varying the vertical angle φ, it may be difficult to use the data in the signal processing by the signal processing unit 2 in some cases.

In contrast, in the scanning in the second embodiment, the transition of the vertical angle φ is performed at every layer. Namely, the omnidirectional scanning unit 3 increases the vertical angle φ at every layer in the vertical angle transition range to move the scanning direction to the next layer. Such a scanning by the second embodiment will be referred to as "a partial multilayer scanning".

Figure 7A:
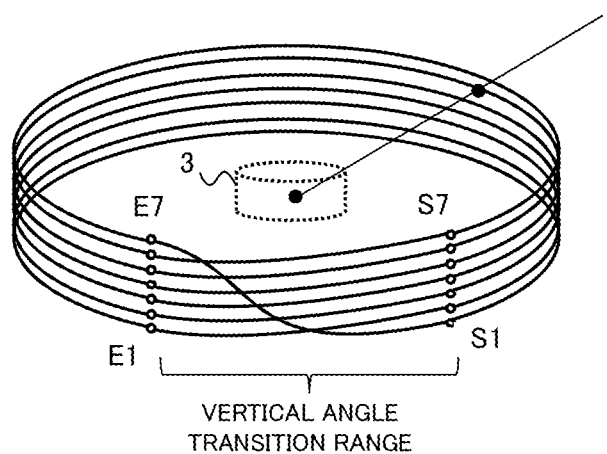
FIGS. 7A to 7C illustrate loci of a partial multilayer scanning according to the second embodiment.
Figure 7B:
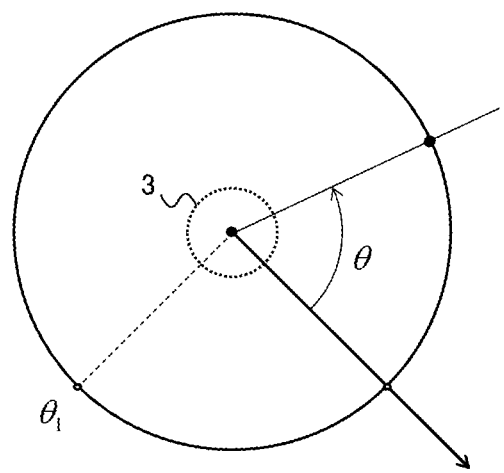
Figure 7C:
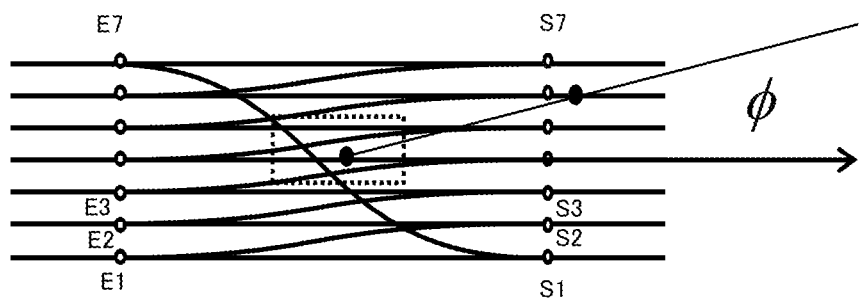

FIG. 7A to 7C illustrate loci by the partial multilayer scanning according to the second embodiment. FIG. 7A is a perspective view of the locus by the partial multilayer scanning, FIG. 7B is a plan view of the locus of the partial multilayer scanning, and FIG. 7C is a side view of the locus of the partial multilayer scanning. It is noted that FIGS. 7A to 7C illustrate the loci that a certain point of the transmission light pulses Pt in the emission direction creates by the scanning by the omnidirectional scanning unit 3.

As illustrated, in the partial multilayer scanning in the second embodiment, the omnidirectional scanning unit 3 performs the scanning without varying the vertical angle φ in the effective horizontal field of view ($\theta = \theta_1 = 270°$). Then, the omnidirectional scanning unit 3 increases the vertical angle φ in the subsequent vertical angle transition range to move the emission direction to the immediately upper layer. The omnidirectional scanning unit 3 performs such a scanning at every layer.

Specifically, as illustrated in FIGS. 7A and 7C, first the omnidirectional scanning unit 3 scans from the start point S1 to the end point E1 in the lowermost layer (the first layer) without varying the vertical angle φ, and then increases the vertical angle φ by the amount of one layer in the subsequent vertical angle transition range in the lowermost layer thereby to move the emission direction to the start point S2 in the second layer.

Next, the omnidirectional scanning unit 3 scans from the start point S2 to the end point E2 without varying the vertical angle φ in the second layer, and then increases the vertical angle φ by the amount of one layer in the subsequent vertical angle transition range in the lowermost layer thereby to move the emission direction to the start point S3 in the third layer. The omnidirectional scanning unit 3 performs this scanning at every layer in order. When the emission direction reaches the end point E7 in the uppermost layer (the seventh layer), the omnidirectional scanning unit 3 varies the vertical angle φ in the vertical angle transition range to move the emission direction from the end point E7 in the uppermost layer to the start point S1 in the lowermost layer, similarly to the helical scanning in the first embodiment. Then, the omnidirectional scanning unit 3 continues the scanning of next one frame from the start point S1 in the lowermost layer in the same manner.

Assuming that the number of layer n=7 and the range of the vertical angle φ is: $-15° \leq \varphi \leq 15°$ similarly to the first embodiment, the omnidirectional scanning unit 3 moves the emission direction to the immediately upper layer by increasing the vertical angle φ by 5° in the vertical angle transition range at every layer.

In the second embodiment, assuming that the elapsed time after starting the partial multilayer scanning is "t", the horizontal angle is obtained as follows:

$$\theta = \mathrm{mod}(\omega t, 360n) \qquad (5)$$

※ Accumlated horizontal angle along helical rotation $$\theta' = \mathrm{mod}(\omega t, 360) \qquad (6)$$

※ Horizontal angle in plane viewed from above

It is noted that the horizontal angle θ in the equation (5) is the accumulated horizontal angle along the helical rotation, and the horizontal angle θ' in the equation (6) is the horizontal angle when the locus of the helical scanning is horizontally viewed as shown in FIG. 5B.

Assuming that the number of layers of the partial multilayer scanning is "n", the vertical angle at the start point is $\varphi_0 = -15°$, and the effective horizontal field of view $\theta_1 = 270°$, the vertical angle φ is obtained as follows.

$$\begin{cases} \phi = \Delta\phi \cdot \mathrm{floor}\left(\dfrac{\theta}{360}\right) - \phi_0 & 360k < \theta < 360k + \theta_1 \quad k = 0, 1, \Lambda, n-2 \quad (7) \\ \phi = g(\theta' - \theta_1) & 360k + \theta_1 < \theta < 360(k+1) \quad k = 0, 1, \Lambda, n-2 \quad (8) \\ \phi = f(\theta' - \theta_1) & 360(n-1) + \theta_1 < \theta < 360n \quad (9) \end{cases}$$

The function "floor(argument)" in the equation (7) indicates the layer being scanned by the transmission light pulse Pt, and the value is "the integer part of the argument". For example, when the first layer is being scanned, "floor(0)=0". Also, the equation (8) represents the vertical angle φ in the vertical angle transition range, and the equation (9) represents the vertical angle φ during the transition from the end point E7 to the start point S1.

In the second embodiment, the omnidirectional scanning unit 3 can obtain three-dimensional segment data by performing the partial multilayer scanning by the transmission light pulses Pt. Also, in the second embodiment, it is possible to realize the multilayer scanning with the constant vertical angle φ in the effective horizontal field of view other than the vertical angle transition range. Therefore, the segment data can be obtained in such a situation that the vertical angle φ is fixed.

[Modified Examples]

While the number of layers for the helical scanning and the partial multilayer scanning is seven in the above embodiments, this is merely an example, and the scanning can be performed with an arbitrary number of layers. Also, while the emission direction is moved by increasing the vertical angle φ from the lower layer side to the upper layer side in the above embodiments, the emission direction may be moved by decreasing the vertical angle φ from the upper layer side to the lower layer side.

INDUSTRIAL APPLICABILITY

This invention can be used for a technique of obtaining surrounding environment information by emitting the laser light.

BRIEF DESCRIPTION OF REFERENCE NUMBERS

1 Light transmission/reception unit
2 Signal processing unit
3 Omnidirectional scanning unit
4 Scanning angle control unit
5 Scanning angle detecting unit
13 Laser diode
16 Light receiving element

The invention claimed is:

1. A light control device comprising:
a light transmission/reception unit installed in a movable body and including an emission unit configured to emit a light and a light receiving unit configured to receive light reflected by an object around the movable body; and
a control unit configured to control the emission unit to continuously shift the light emitted by the emission unit in a first direction and a second direction crossing the first direction to repeatedly perform helical scanning including helical turns and a return movement,
wherein the control unit moves the light from a start point over plural layers to an end point during the helical turns, and moves the light from the end point directly to the start point, crossing over the plural layers, within a predetermined angle range during the return movement.

2. The light control device according to claim 1, further comprising a signal processing unit configured to:
obtain a first angle information indicating an emission angle of the light emitted by the emission unit in the first direction; and
obtain a second angle information indicating an emission angle of the light emitted by the emission unit in the second direction,
wherein the control unit controls the emission unit based on the first angle information and the second angle information.

3. The light control device according to claim 2, wherein, when an angle of the second angle information becomes a predetermined angle, the control unit controls the emission unit such that the first angle information is determined to be a first reference angle and the second angle information is determined to be a second reference angle.

4. The light control device according to claim 1, further comprising a detecting unit configured to detect at least one of a distance to the object and an angle of the object based on a light receiving result of the light receiving unit.

5. The light control device according to claim 1,
wherein the first direction is a horizontal direction,
wherein the control unit controls the emission unit such that the light is emitted in an omnidirection of the first direction, and
wherein the light receiving unit receives the light reflected by the object existing in the omnidirection of the first direction.

6. The light control device according to claim 1, wherein, when a emission angle of the light in the first direction is in the predetermined angle range, the control unit increases the emission angle of the light by a first angle in the second direction to successively shift the light over plural layers from a start layer to an end layer, and when the emission angle of the light in the first direction is in the predetermined angle range after shifting the light to the end layer, the control unit shifts the emission angle of the light from the end layer to the start layer.

7. A light control method executed by a light control device comprising a light transmission/reception unit installed in a movable body and including an emission unit configured to emit a light and a light receiving unit configured to receive the light reflected by an object around the movable body,
the method comprising a control process to control the emission unit to continuously shift the light emitted by the emission unit in a first direction and a second direction crossing the first direction to repeatedly perform helical scanning including helical turns and a return movement,
wherein the control process moves the light from a start point over plural layers to an end point during the helical turns, and moves the light from the end point directly to the start point, crossing over the plural layers, within a predetermined angle range during the return movement.

8. A non-transitory computer-readable medium storing program executed by alight control device comprising: a light transmission/reception unit installed in a movable body and including an emission unit configured to emit a light and a light receiving unit configured to receive the light reflected by an object around the movable body; and a computer,
the program causing the computer to function as a control unit configured to control the emission unit to continuously shift the light emitted by the emission unit in a first direction and a second direction crossing the first direction to repeatedly perform helical scanning including helical turns and a return movement,
wherein the control unit moves the light from a start point over plural layers to an end point during the helical turns, and moves the light from the end point directly to the start point, crossing over the plural layers, within a predetermined angle range during the return movement.

* * * * *